April 19, 1932.  M. S. MEAD, JR  1,854,949
MEASUREMENT OF SPEED VARIATIONS
Filed June 23, 1930
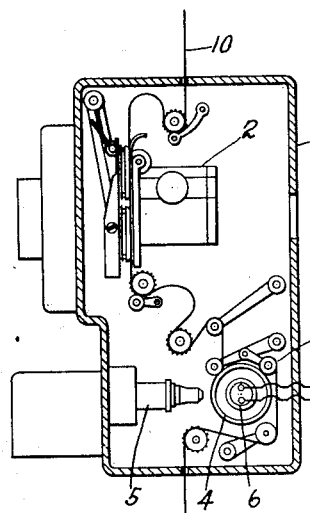
Fig.1.
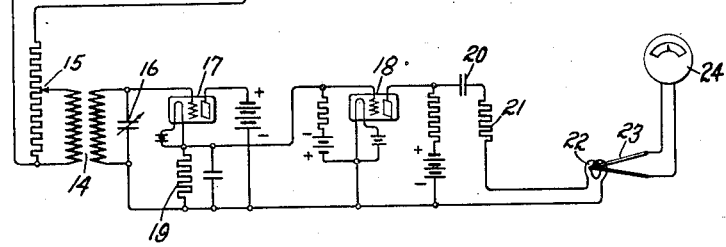
Fig.2.
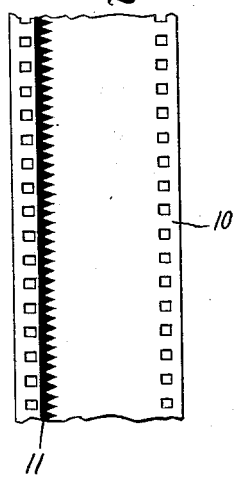
Inventor:
Milton S. Mead Jr.,
by Charles E. Mueller
His Attorney.

Patented Apr. 19, 1932

1,854,949

UNITED STATES PATENT OFFICE

MILTON S. MEAD, JR., OF SCHENECTADY, NEW YORK, ASSIGNOR TO GENERAL ELECTRIC COMPANY, A CORPORATION OF NEW YORK

MEASUREMENT OF SPEED VARIATIONS

Application filed June 23, 1930. Serial No. 463,332.

My invention relates to the measurement of speed variation of a rotatable member, particularly the record moving member of sound recording or reproducing apparatus. It is well known that for the best results with such apparatus the sound record, whether it be a phonograph disk or film, should be moved with a speed which is as nearly absolutely uniform as possible, assuming of course that uniform movement occurred at the time of recording. It is the object of my invention to provide an improved method and means for measuring small variations in the speed of the reproducing apparatus.

My invention will be better understood from the following description taken in connection with the accompanying drawings, and its scope will be pointed out in the appended claims.

In the drawings, Fig. 1 is a view of apparatus and a circuit diagram illustrating my invention; and Fig. 2 shows a portion of a film having thereon the record of a constant frequency note.

I have chosen to illustrate my invention as applied to a machine for reproducing pictures and accompanying sounds from a film record. The enclosing casing 1 of such a machine has in the upper portion thereof the picture projecting apparatus 2 and in the lower portion the sound reproducing apparatus 3. The latter is shown as comprising a drum 4 over which the film passes, the optical system by which a narrow beam of light is projected on the sound record portion of the film and the photoelectric cell 6 arranged to receive the light after passing through the sound record. The cell is shown connected by the leads 7 to the usual amplifier 8 which preferably is of the electron discharge type. The film is driven intermittently through the picture projecting part of the apparatus and uniformly through the sound reproducing part of the apparatus by suitable means such for example as a synchronous motor, not shown.

For the purpose of measuring any speed variations of the film in the sound reproducing part of the apparatus, I provide a special film 10 having a constant frequency note 11 recorded thereon, such for example as illustrated by Fig. 2. When the machine is operated with such a film threaded therein, it will be seen that so long as the machine operates with a uniform speed the current impulses obtained will have a uniform frequency, and that any variations in speed that occur will result in proportionate changes in the frequency of the impulses. Such a change in frequency may be converted into sound and detected audibly. However, in accordance with my invention I provide for a visual measurement of any such variations. I connect the output circuit of the amplifier 8 to the primary of the transformer 14 through the adjustable resistance connection 15. Across the secondary of the transformer 14 I connect the variable condenser 16 and adjust this condenser so as to tune the circuit to a frequency slightly different from that of the impulses recorded on the film record. By this means the varying frequency impulses are converted into varying amplitude impulses. By suitable well known means I detect and amplify these variable amplitude impulses and finally cause them to operate a suitable indicating device. As an example of such apparatus I have shown the electron discharge detector 17 and the electron discharge amplifier 18 connected to each other through the resistance 19, which resistance it will be noted also is included in the grid circuit of the detector whereby a linear response may be obtained therefrom. The output circuit of the amplifier 18 is shown connected through the condenser 20 and resistance 21 to the heating coil 22 of the thermoelectric generator 23 which for convenience is shown as comprising merely a thermocouple. The output circuit of the thermoelectric generator connects with the milliammeter 24.

With the apparatus thus arranged, any slight variation in the speed of the film driving mechanism produces corresponding variations in the frequency of the impulses supplied to the transformer 14. Because of the tuned secondary circuit of this transformer such frequency variations are converted into amplitude variations which vary in magnitude in accordance with the variations in the frequency. As long as the frequency does not vary no current is supplied to the heating coil 22, but when variations in frequency do occur coil 22 is energized in accordance therewith to heat the hot junction of the thermo-electric generator which in turn supplies current to the milliammeter 24. Thus the speed variations of the film driving mechanism are registered by the milliammeter. Various other forms of registering apparatus may be employed for the milliammeter and thermo-electric generator. For example, an oscillograph may be employed for recording the amount of speed variations and the times at which they occur.

If my invention is employed for measuring speed variations in a phonograph apparatus, a phonograph record would be employed having recorded thereon a constant frequency note. In this case an electric pick-up would be employed which would be connected to the amplifier 8 in the well understood manner.

I have chosen the particular embodiment described above as illustrative of my invention and it will be apparent that various modifications may be made without departing from the spirit and scope of my invention, which modifications I aim to cover by the appended claims.

What I claim as new and desire to secure by Letters Patent of the United States, is,—

1. The method of measuring the speed variation of a rotatable member which comprises producing electrical impulses whose frequency varies with the speed of said member, converting the frequency variations of said impulses into amplitude variations and measuring said amplitude variations.

2. The method of measuring the speed variation of sound reproducing apparatus provided with a record carrier having a constant frequency recorded thereon which comprises causing the apparatus to move the record, translating the record into electrical impulses, converting frequency variations of said impulses into amplitude variations and measuring said amplitude variations.

3. The method of measuring the speed variation of a film sound reproducer provided with a film having a constant frequency sound record thereon which comprises operating the reproducer with said film, translating the sound record into electrical impulses, converting frequency variations of said impulses into amplitude variations, and registering said amplitude variations.

4. Apparatus for measuring the speed variation of a rotatable member comprising means for producing electrical impulses whose frequency is proportional to the speed of said member, means for converting variations in impulse frequency into variations in impulse amplitude, and means for measuring the impulse amplitude.

5. Apparatus for measuring the speed variation of a sound reproducing machine having a carrier provided with a constant frequency record and having means for translating the record into electrical impulses comprising means for converting frequency variations in said impulses into amplitude variations, and means for measuring said amplitude variations.

6. Apparatus for measuring the speed variation of a sound reproducing machine having a carrier provided with a constant frequency record and having means for translating the record into electrical impulses comprising means for converting frequency variations in said impulses into amplitude variations, means for amplifying said amplitude variations, and means for registering the amplified variations.

7. Apparatus for measuring the speed variation of a film sound reproducer provided with a film having a constant frequency record thereon and provided with means for translating a film record into electrical impulses, comprising means for converting frequency variations in said impulses into amplitude variations, and means responsive to said amplitude variations for producing a visual registration thereof.

8. Apparatus for measuring the speed variation of a film sound reproducer provided with a film having a constant frequency record thereon and provided with means for translating a film record into electrical impulses, comprising means for converting frequency variations in said impulses into amplitude variations, a thermo-electric generator arranged to be heated in accordance with said amplitude variations, and an indicating device connected with said generator.

9. Apparatus for measuring the speed variation of a film sound reproducer having means for translating a film record into electrical impulses comprising a film having a constant frequency note recorded thereon, means including a tuned circuit for converting frequency variations in said impulses into amplitude variations, a thermo-electric generator, a heater therefor connected with said converting means, and a milliammeter connected with said generator.

In witness whereof, I have hereunto set my hand this 20th day of June, 1930.

MILTON S. MEAD, Jr.